United States Patent [19]

Berkman

[11] Patent Number: 4,518,084
[45] Date of Patent: May 21, 1985

[54] STORAGE SYSTEM FOR EITHER BOXED OR UNBOXED CASSETTES

[75] Inventor: Joseph L. Berkman, Mamaroneck, N.Y.

[73] Assignee: Berkman Industries, Inc., Boynton Beach, Fla.

[21] Appl. No.: 531,779

[22] Filed: Sep. 13, 1983

Related U.S. Application Data

[63] Continuation-in-part of Ser. No. 429,200, Sep. 30, 1982, Pat. No. 4,432,453.

[51] Int. Cl.³ .................... B65D 85/30; B65D 85/62
[52] U.S. Cl. .................................... 206/387; 206/493
[58] Field of Search ................ 206/387, 493, 73, 541, 206/453, 458, 449; 229/15; 190/28; 312/200

[56] References Cited

U.S. PATENT DOCUMENTS

| | | | |
|---|---|---|---|
| 3,756,383 | 5/1973 | Kryter | 206/387 |
| 3,856,369 | 12/1974 | Commiant | 206/387 |
| 3,907,116 | 9/1978 | Wolf et al. | 206/387 |
| 4,003,468 | 1/1975 | Berkman | 206/387 |
| 4,117,931 | 10/1978 | Berkman | 206/387 |
| 4,231,473 | 11/1980 | Aprahamian | 206/387 |
| 4,432,453 | 2/1984 | Berkman | 206/387 |

OTHER PUBLICATIONS

Bell Catalog, 1979, p. 287.

Primary Examiner—Joseph Man-Fu Moy
Attorney, Agent, or Firm—Lackenbach Siegel Marzullo Presta & Aronson

[57] ABSTRACT

A case having at least one row and a plurality of tandem compartments for interchangeably receiving and storing either a single boxed cassette or two unboxed cassettes in any compartment. The case has opposite side walls connected by means of a bottom wall, with the compartments disposed parallel and transverse to the opposite side walls; each compartment comprising a pair of projections separating and dividing the said compartment into storage zones on both sides of said projections. The opposite side walls define pairs of vertical ribs for guiding and securely retaining a single boxed cassette in place atop said projections, and further define vertical end stops adjacent said ribs for limiting transverse movement of unboxed cassettes stored and securely retained between said projections and opposite guides projecting inwardly from said side walls.

15 Claims, 11 Drawing Figures

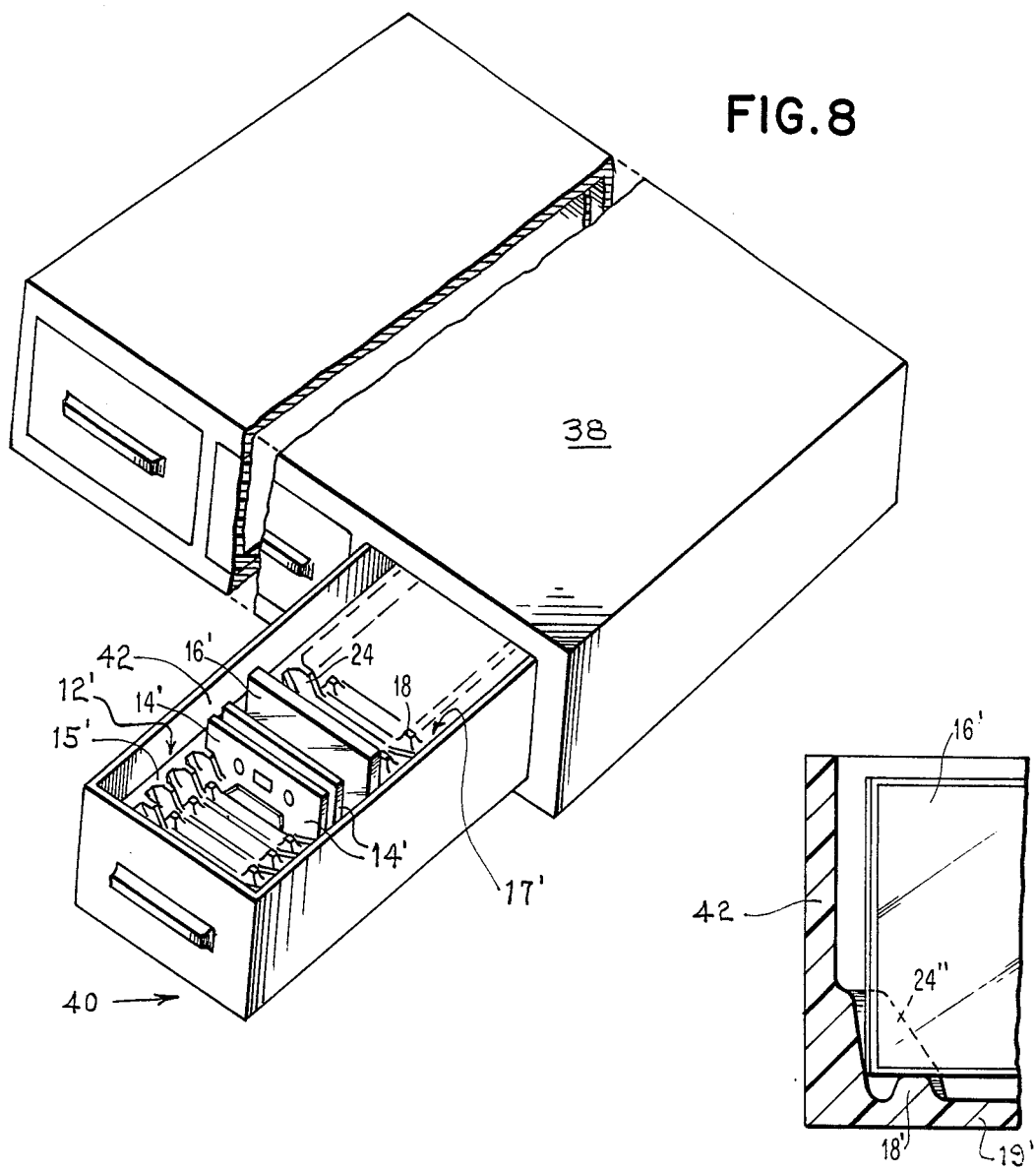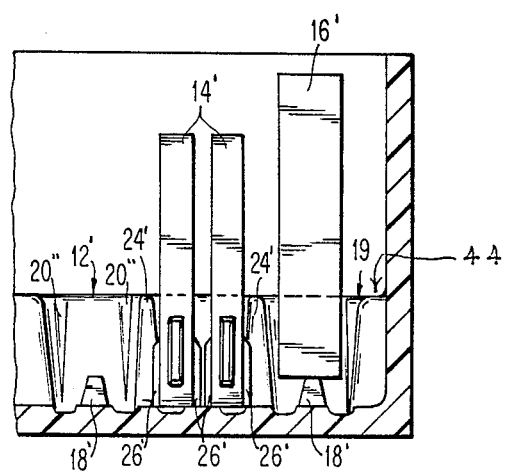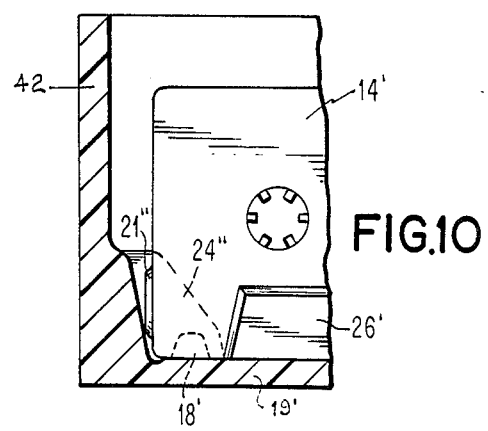

STORAGE SYSTEM FOR EITHER BOXED OR UNBOXED CASSETTES

This application is a continuation-in-part of my earlier filed co-pending U.S. patent application, Ser. No. 429,200; filed Sept. 30, 1982 now U.S. Pat. No. 4,432,453; and it is also related to my copending U.S. patent applications, Ser. No. 332,974; filed Dec. 21, 1981, and Ser. No. 348,149; filed Feb. 11, 1982.

This invention relates to the storage of cassettes, and more particularly to a case or storage system capable of interchangeably receiving and storing either boxed or unboxed cassettes.

BACKGROUND OF THE INVENTION

Magnetic tape recordings have heretofore generated the production and sale of storage cases of varied constructions and configurations. Each such structure, however, was designed to handle a particular arrangement of magnetic tape enclosures. For example, my own U.S. patents in this art area are identified hereinbelow:

U.S. Pat. No. D237,338
U.S. Pat. No. D233,375
U.S. Pat. No. D230,528
U.S. Pat. No. D230,527
U.S. Pat. No. 3,889,817
U.S. Pat. No. 4,003,468
U.S. Pat. No. 4,117,931

Other prior art references are U.S. Pat. No. 3,736,036 which discloses a polygonal-shaped cabinet defining a plurality of side storage compartments. Each compartment having dividers forming pockets orthogonally to each other so that in one direction boxed cassettes are stored and in a transverse direction unboxed cassettes are capable of being stored.

In another holder for cassettes as described in U.S. Pat. No. 3,856,369, the front side of a box is open and the bottom is divided into parallel compartments for cassettes. A spring in each compartment raises the corner of a cassette up to a stop, whereby the spring is released and pushes the cassette frontwards so as to project itself and be easily gripped for removal.

In the Cassette Rack of U.S. Pat. No. 3,907,116, a rack with sloping shelves holds both boxed and unboxed cassettes, with the shelves cut away to define nesting recesses for holding the smaller unboxed cassettes.

U.S. Pat. No. 3,756,383 to Kryter teaches a case for either boxed cassettes or unboxed cassettes. Here, sets of ribs are provided at the front and rear faces of the case to enable transverse parallel storage of cassettes between the horizontal ribs and similar storage of the boxes therefor between the vertical ribs, but with the latter elevated upon the horizontal ribs.

None of the prior art patents, however, disclose a storage case wherein each compartment or bin is capable of holding one boxed cassette or two unboxed cassettes.

SUMMARY OF THE INVENTION

Accordingly, it is the principal object of the present invention to provide a case which is capable of receiving and storing in every compartment or bin either a single boxed cassette or two unboxed cassettes.

It is another object of the invention to provide a case which is simple in construction and economical to manufacture.

Another object is to provide a case of any size, and one which can be made of most available materials.

Accordingly, the present invention is achieved by a case comprising opposite side walls connected to a bottom wall, and parallel compartments disposed transverse to the opposite side walls. Each compartment comprising a pair of projections separating and dividing said compartment into storage zones on either side of the projections. The opposite side walls define pairs of vertical ribs for guiding and securely retaining a single boxed cassette in place atop the projections, and further define vertical end stops adjacent the ribs for limiting transverse movement of unboxed cassettes stored and securely retained between the projections and opposite guides projecting inwardly from the side walls.

BRIEF DESCRIPTION OF THE DRAWINGS

The invention will now be described with reference to the accompanying drawings, wherein:

FIG. 8 is a perspective view, an alternate construction of the invention wherein the case is in the form of a drawer of a cabinet;

FIG. 9 is a fragmentary, transverse, cross-sectional view, similar to that of FIG. 5, showing the integral construction of the drawer and tray-like insert article with a portion of boxed cassette stored and received in a typical compartment;

FIG. 10 is a transverse, sectional view, similar to that of FIG. 9, but illustrating a portion of an unboxed cassette stored and received in a storage zone or portion of the compartment; and FIG. 11 is a fragmentary, longitudinal, cross-sectional view of an end of the drawer and showing in a first compartment one boxed cassette and in another adjacent compartment two unboxed cassettes.

DESCRIPTION OF THE PREFERRED EMBODIMENTS

Figure 1:
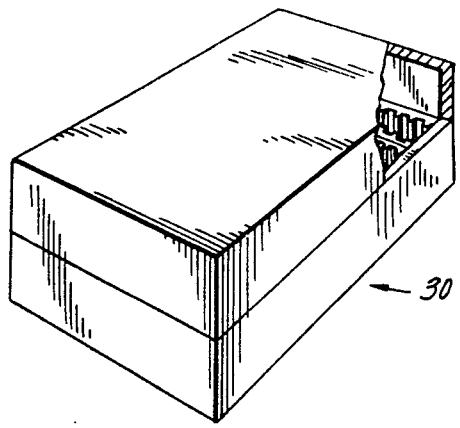
FIG. 1 is a perspective view of a cabinet module embodying the storage system of the invention.

Referring now to FIGS. 4–7, the storage system 10 may simply comprise a tray-like article for use alone or as an insert in a case or cabinet module. The storage system or article 10 is provided with a series of identical tandem compartments 12, each of which is capable of receiving and storing either one boxed cassette or two unboxed cassettes. For example, any convenient storage size may be employed, say to hold 12, 24, 30 or 36 boxed cassettes, or to hold 24, 48, 60 or 72 unboxed cassettes.

Figure 4:
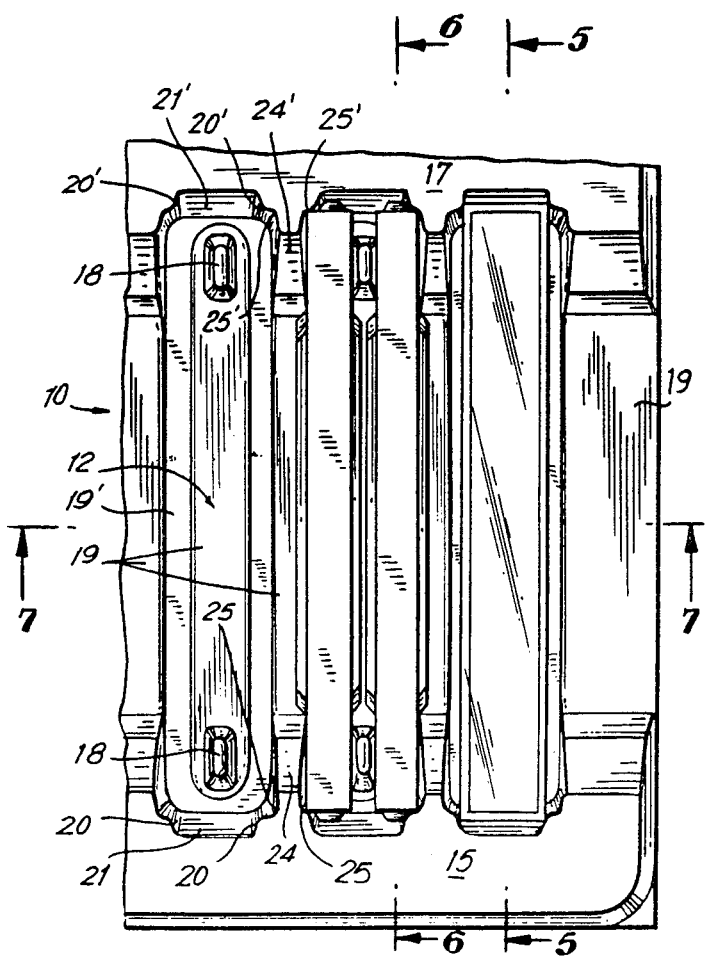
FIG. 4 is a plan view of the storage system showing three compartments, one being empty and the other two occupied.
Figure 5:
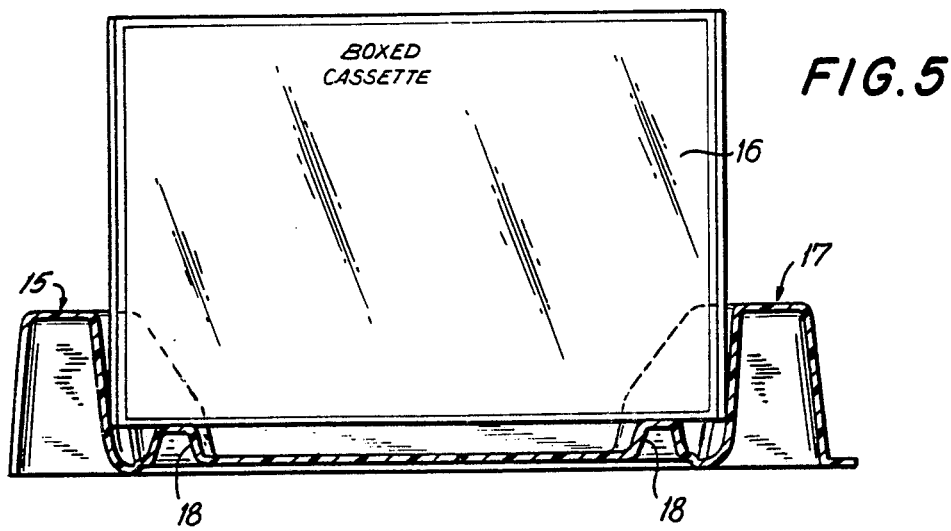
FIG. 5 is a cross-sectional view taken along the line 5—5 of FIG. 4.
Figure 7:
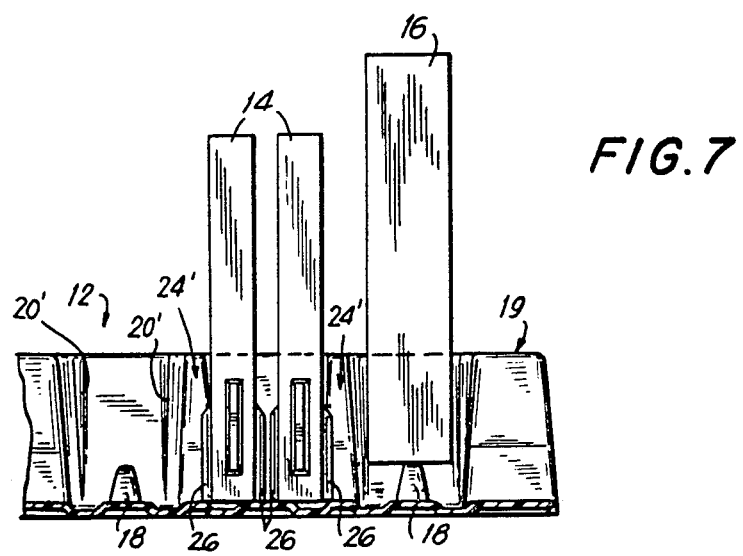
FIG. 7 is a cross-sectional view taken along the line 7—7 of FIG. 4.

As best shown in FIGS. 4 and 7, the center compartment or bin 12 illustrates how two unboxed cassettes 14 are held in place, while the adjacent compartments simply show a blank bin 12 and a single boxed cassette 16 in the other compartment or bin. As shown in FIG. 5, the boxed cassette 16 is seated upon projections or ribs 18 upwardly standing from the bottom 19 of the tray. Such ribs 18 can also be secured to the front 15 and rear 17 walls. Pairs of oppositely disposed vertical ribs 20, 20' securely retain the boxed cassette 16 in place between opposite end walls 21, 21'; until it is gripped and removed from the compartment or bin 12.

Figure 6:
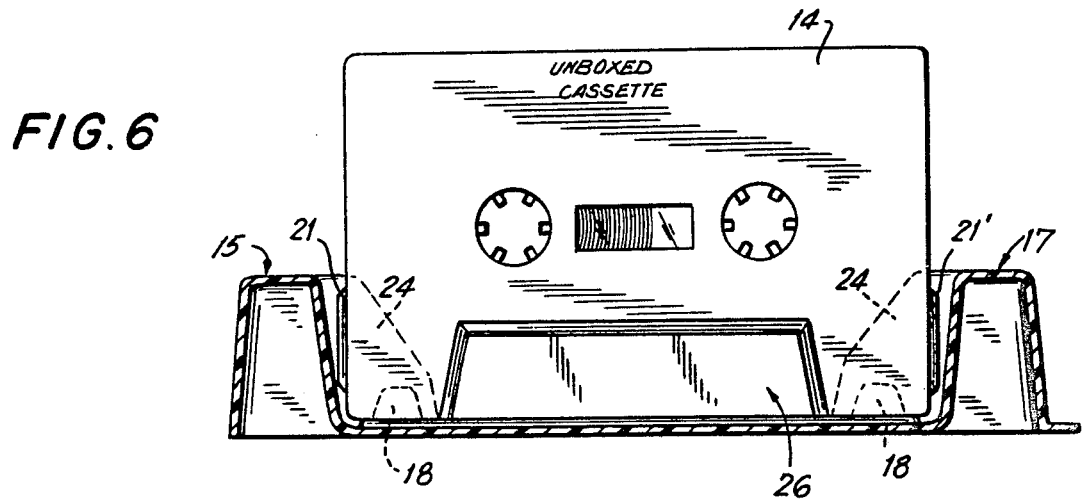
FIG. 6 is a cross-sectional view taken along the line 6—6 of FIG. 4.

Alternately, and as best shown in FIGS. 4 and 6–7, one or both of the two unboxed cassettes 14 also can be retained securely in place in the same compartment or bin 12 as the boxed cassette 16. However, here each unboxed cassette 14 is positioned against the bottom surface 19 of the tray-like article 10, which may be suitably provided with trough-like ribs 19' to provide strength to bottom of the article. In addition, each unboxed cassette 14 is positioned between the ribs 18 and a side wall projecting guide 24, 24'. The side wall projecting guide 24, 24' also serving as an end stop 25, 25' for limited sidewise movement of the unboxed cassette 14. It should be noted that the ribs 18 should be short enough so that they do not interfere with the thickest portion 26 of an unboxed cassette 14. Similarly, the projecting guides 24, 24' do not extend transversely across the bin 12 as the thickest portions 26 of a pair of adjacently disposed unboxed cassettes 14 just clear each other, as best shown in FIG. 7.

Thus, with the storage system of the invention, an article, such as an insert or case may be fabricated, suitably from materials, such as wood, metal, paper, plastic, or in the case of plastic materials injection molded or vacuum formed to create a storage device having plural compartments in one or more rows of compartments. For example, a case may be provided with two rows of six compartments each or two rows of twelve compartments each. In all cases, each compartment or bin is capable of interchangeably receiving and storing either one boxed cassette or two unboxed cassettes.

Figure 3:
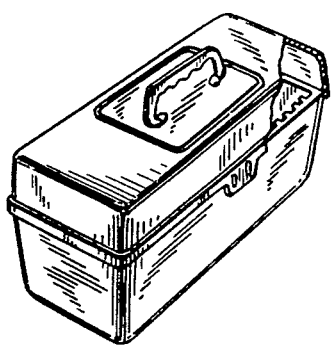
FIG. 3 is a further perspective view of an alternate form of the valise embodiment, wherein the compartments or bins for holding and storing either the boxed or unboxed cassettes are integrally formed into the case.

It should be appreciated that the storage device can be employed by itself or it can be used as an insert fastened to the inside of a suitable cabinet module or valise. Alternatively, the storage device can be conveniently molded on the inside of a case, as is best shown in the modification of FIG. 3. This modification is similar to any storage case device disclosed in U.S. Pat. No. 4,117,931, which is incorporated herein by reference.

Figure 2:
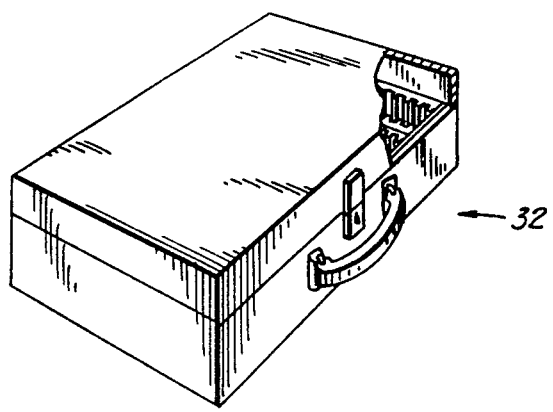
FIG. 2 is another perspective view, but of a valise embodiment of the invention.

Other alternate embodiments of the invention are shown in FIGS. 1 and 2, wherein both a cabinet module 30 and portable valise 32 structure are respectively illustrated. In these modifications of the invention, the storage device or tray-like article can be suitably secured to the bottom portion of the cases which have hinged covers forming part of the overall constructions. Other examples of like cases are shown in my U.S. Pat. No. 4,117,931, which is also incorporated herein by reference.

In FIGS. 8–11, an alternate construction of the invention is illustrated. As shown therein, a three drawer cabinet 38 is typical although the cabinet may comprise more or less drawers, such as 1 or 2 or even 4 or 5 and the like. Clearly, the cabinet may take the form of a multi-level chest with one, two or more drawers per level depending upon the storage capacity desired. In such cabinets, the drawers are preferably injection molded, whereas with the tray-like article or insert previously described in connection with FIGS. 1–2 and 4–7 the insert is suitably vacuum molded; although in the embodiment of the integrally formed "car" type cassette case (FIG. 3), the compartments and case are integrally molded together as a single unit.

Each of the three drawers may be made so that each can accommodate either 12 boxed audio cassettes or 24 unboxed audio cassettes; or 15 boxed audio cassettes or 30 unboxed audio cassettes; or 10 boxed audio cassettes or 20 unboxed audio cassettes, or any other desired numbers of cassettes.

Although the cabinet and even the drawer may be manufactured from wood, or even metal, or both may be conveniently made of plastic. Also, the drawer may have one or more rows of compartments.

All of the tandem compartments 12' are identical to each other, and each is capable of receiving and storing either one boxed cassette or two unboxed cassettes 14' in the same compartment. The individual "boxed" compartment or storage zones for the two unboxed cassettes 14' securely retains in place the one boxed or two unboxed cassettes. As best shown therein, each bin or compartment 12' securely holds and retains in place a single boxed cassette 16' or two unboxed cassettes 14'. Boxed cassettes 16' sit atop projections or ribs 18' upwardly projecting from the bottom 19' and/or the oppositely disposed walls 15' and 17'.

The pairs of oppositely disposed vertical ribs 20" securely retain a boxed cassette 16' laterally or transversely in place between opposite end walls 21". These same vertical ribs 20" are limit or end stops at right angles to the walls of the vertical ribs 20" which serve to limit sidewise or end to end movement of the unboxed cassette 14'.

The unboxed cassettes 14' are generally disposed adjacent the bottom surface 19" of the drawer 40. Each of the two unboxed cassettes 14' are retained in zones or areas of the same bin or compartment 12' such that two of the unboxed cassettes 14' can be substituted for a single boxed cassette 16'. Of course, a single unboxed cassette 14' may be disposed in a compartment 12' where one has an odd number of unboxed cassettes 14'.

Each unboxed cassette 14' is securely retained in place between ribs 18' and a wall projecting guide 24" which may extend from either or both side and/or bottom walls. The ribs 18' should also be short enough so that they do not interfere with the thickest portions 26' of a conventional unboxed cassette 14'. In a like manner, the wall projecting guides 24" do not interfere with the protruding cassette portions 26' which just about abut each other between said wall projecting guides 24", as shown in FIG. 11.

In the embodiment of FIGS. 8–11, the storage device or article case of the invention may take the form of a drawer having integrally molded compartments in one or more rows. A single row drawer of compartments as shown in FIG. 8 is in reality equivalent to the lower half of the injection molded "tool box" embodiment shown in FIG. 3 which included in addition thereto an integrally molded hinge and cover assembly. Such a drawer unit of integrally formed compartments in one or more rows may be mated with corresponding cabinet units having one or more drawer openings adapted to enable a drawer to be suitably slid into and out of the drawer opening. Of course, suitable drawer stops (not shown) may be provided on the drawer engageable with the cabinet unit for precluding the drawer unit from being entirely removed from the drawer opening.

It should be noted that the drawer need not have raised side wall edges 42 as shown in FIG. 8, as the side edges may simply end at about the height level 44 of the wall projecting guides 24" or the front and rear walls 15, 17.

It should also be appreciated that with such a cabinet and drawer unit type of construction, additional storage capacity can be achieved by adding additional cabinet and drawer units together in a horizontal manner or by stacking the cabinet and drawer units vertically. Such arrangements can be achieved in the same manner as set forth in my aforementioned copending related U.S. patent applications, Ser. Nos. 332,974; filed Dec. 21, 1981, and 348,149; filed Feb. 11, 1982. Thus, the arrangement of such vertical stacking by tongue and groove means and the attachment of side-to-side cabinets by clip and detent means is also included herein by reference.

Also, where a drawer type of unit is employed, the cabinet is in the form of a tubular sleeve with a closed rear end and opened front end, which is suitably closed by the front panel of the integrally formed drawer unit. If desired, the cabinet may have more than one opening. In such cases where the cabinet unit has multiple front openings, then two or more drawer units would be necessary to close off the openings and form an overall storage unit. The front panel of any drawer unit is suitably equipped with well known and conventional handle means, such as the integrally molded handle shown in FIG. 8.

Although the present invention has been described in some detail by way of illustration and example for purposes of clarity of understanding, it will, of course, be understood that various changes and modifications may be made in the form, details, and arrangements of the parts without departing from the scope of the invention as set forth in the following claims.

What is claimed is:

1. A storage unit or holder for magnetic tape cassettes and tape cassette boxes comprising at least one row having a plurality of tandem compartments for interchangeably receiving and storing either a boxed cassette or a pair of unboxed cassettes in the same compartment, each said compartment having opposite side walls connected by means of a bottom wall, and having twin parallel storage zones disposed transverse to said opposite side walls, each said compartment further comprising projection means separating and dividing said compartment into said twin parallel storage zones on either side of said projection means; at least one of said opposite side walls having vertical rib means disposed inwardly from said side walls for guiding and securely retaining a single boxed cassette in place in said compartment atop said projection means, and vertical end stop means for limiting transverse movement of unboxed cassettes stored securely retained between said projection means and said vertical rib means.

2. The storage unit or holder according to claim 1, wherein said vertical rib means and said vertical end stop means are unitary and form corner projections in the corners of each compartment.

3. The storage unit or holder according to claim 1, wherein said projection means comprises a pair of projections; each of said opposite side walls having pairs of vertical ribs; said vertical end stop means being disposed adjacent said vertical ribs; and oppositely disposed compartment separating guides projecting inwardly from said opposite side walls.

4. The storage unit or holder according to claim 1, wherein said projection means extend from said bottom wall.

5. The storage unit or holder according to claim 1, wherein said projection means extend from said opposite side walls.

6. The storage unit or holder according to claim 5, wherein said projection means also extending from said bottom wall.

7. The storage unit or holder according to claim 3, wherein said guides project inwardly from adjacent corner projections of each pair of compartments in the manner of a flying buttress.

8. The storage unit or holder according to claim 1, wherein said case is in the form of a tray-like article for use either alone in storing boxed magnetic tape cassettes, a double amount of unboxed magnetic tape cassettes, or any desired combination of boxed and unboxed magnetic tape cassettes.

9. The storage unit or holder according to claim 1, including a case for said storage unit or holder.

10. The storage unit or holder according to claim 9, wherein said storage unit or holder comprises at least one drawer having a plurality of said tandem compartments integrally formed together with said drawer for receiving and storing therein interchangeably either said boxed cassette or a pair of unboxed cassettes; and said drawer being receivable in a front opening in said case associated with said drawer, so as to enable said drawer to be slidably movable in said opening from a closed position to an open condition.

11. The storage unit or holder according to claim 10, wherein said case is a cabinet having a plurality of openings accommodating an equal number of drawers.

12. The storage unit or holder according to claim 10, wherein said drawer is provided with a front panel having handle means.

13. The storage unit or holder according to claim 12, wherein said front panel and said handle means are integrally formed together with said drawer from a plastic material.

14. The storage unit or holder according to claim 12, wherein said drawer comprises at lest one row of compatments.

15. The storage unit or holder according to claim 12, wherein said rows are adjacently disposed and comprise an equal number of compartments.

* * * * *